United States Patent Office 3,444,145
Patented May 13, 1969

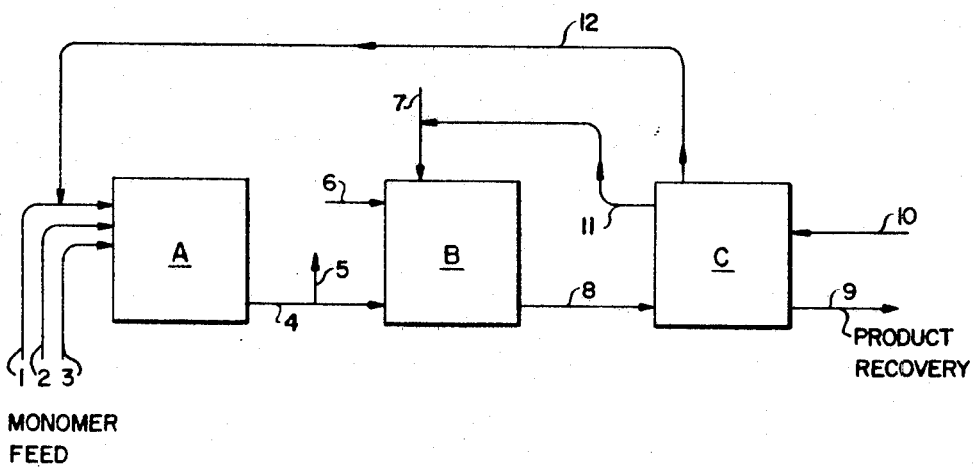

3,444,145
PROCESS FOR PREPARING STABLE
POLYSULFONES
Edward A. Youngman, Lafayette, Ronald S. Bauer, Orinda, Kenneth C. Dewhirst, San Pablo, and Howard V. Holler and Hans E. Lunk, Oakland, Calif., assignors to Shell Oil Company, New York, N.Y., a corporation of Delaware
Filed Feb. 11, 1965, Ser. No. 431,856
Int. Cl. C08g 25/00
U.S. Cl. 260—79.3                   20 Claims

ABSTRACT OF THE DISCLOSURE

Ethylenic double bonds of polysulfones which are reaction products of sulfur dioxide with conjugated diolefins and optionally other comonomers are catalytically hydrogenated, preferably in the presence of a homogeneous hydrogenation catalyst, in liquid phase in a polar organic solvent which exerts swelling or solvent action on the polymer, preferably a phenol, fluoroalcohol or sulfolane. In a preferred mode an unsaturated polysulfone is produced by reaction of the monomers in a polar organic solvent which is also suitable as hydrogenation medium, the polymerization mixture is freed of excess monomer and reaction initiator, and the resulting polysulfone is catalytically hydrogenated in the resulting reaction mixture in the presence of added hydrogenation catalyst.

---

This invention relates to a process for preparing substantially improved polysulfones. The invention also relates to a process for treating unsaturated polysulfones whereby products having high crystallinity and stability as well as high molecular weights are obtained.

There has been in the past some interest in polysulfones in the preparation of fibers and other commercially useful products. However, these polysulfones have failed to be of commercial value, undoubtedly because of their high costs and/or poor characteristics and properties. The polysulfones have generally been prepared by oxidizing polythioethers or by copolymerizing unsaturated hydrocarbons and sulfur dioxide.

Polysulfone preparation by the former route requires production of polythioethers by reacting dimercaptides with non-conjugated diolefin or with dihalides. However, these reactions require the use of high purity monomers which at best produce polythioethers of relatively low molecular weights. Additionally, complete oxidation of the latter to the corresponding polysulfones has not been attained due to solubility and degradation problems. Thus, polysulfones prepared by this route have poor stability and color characteristics which are apparently due to the presence of intermediate polysulfoxides caused by incomplete oxidation and are thereby quite unsuitable for the manufacture of textiles and the like.

The other method most utilized for preparing polysulfones is that of copolymerizing an unsaturated hydrocarbon monomer and sulfur dioxide. A variety of monoolefinic hydrocarbons have been used such as ethylene, propylene, 1- and 2-butene, isobutylene, pentenes, cyclohexene, etc. The resulting polysulfone materials are alternating 1:1 copolymers having a repeating structural unit

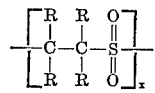

where R may be hydrogen or a hydrocarbyl group and $x$ is an average number which may be quite large.

Although some of these monoolefin-$SO_2$ copolymeric sulfones are of high molecular weight, the repeating structural unit has inherent deficiencies. Such copolymers are severely and rapidly degraded by even the mildest bases such as soaps and organic commercial detergents. They also undergo rapid thermal degradation at moderate temperatures, thereby reverting to the starting hydrocarbon monomers and sulfur dioxide. In addition, with the exception of the ethylene-$SO_2$ copolymer, these materials have poor crystallinity or they are amorphous. Where high molecular weight, stable and highly crystalline products are desired, such as in the preparation of molded materials, films, fibers and the like, these above-mentioned polysulfones are obviously inferior and unsatisfactory.

On the other hand, products obtained by copolymerizing butadiene and $SO_2$ have high molecular weights, high melting points and very high crystallinity while certain other diolefins yield copolymers which are poorly crystalline or amorphous and have low melting points. Both the crystalline and amorphous polymers, however, also possess properties which make them generally unsuitable for many desired uses. In order to produce useful products from resinous materials of this type, it is necessary to heat them to a plastic or liquid state or to prepare solutions of them, such as in preparation of moldings or castings or in the melt or solution spinning of fibers and the like. However, the unsaturated diene polysulfones are thermally unstable. When heated to their flow points, they rapidly decompose to their monomeric materials, e.g., butadiene and sulfur dioxide. In addition, the diene polysulfones are severely degraded by bases. As a result of this instability of the unsaturated polysulfones of this type known heretofore, no practical fabrication methods are known and such polysulfones have no practical utility.

It is an object of this invention to provide a process for preparing stable high molecular weight polysulfones suitable for manufacture into films, moldings and the like. A special object of the invention is to provide a process for producing stable polysulfones having high crystallinity and other properties which make them valuable materials in the preparation of fibers and other useful products. These and other objects will become apparent and better understood from the following disclosure.

A process has now been found whereby commercially attractive, high molecular weight, stable polysulfones, including highly crystalline polysulfones, are prepared by hydrogenating certain unsaturated polysulfones. The process for preparing the stable high molecular weight and highly crystalline polysulfones according to this invention comprises hydrogenating high molecular weight unsaturated copolymers of conjugated diolefins and sulfur dioxide, and ter- and quater-polymers of conjugated diolefins, sulfur dioxide and polymerizable unsaturated monomers.

Unsaturated polysulfones which are hydrogenated according to the invention are those prepared by copolymerizing in the presence of a free radical initiator a conjugated diolefin and sulfur dioxide or mixtures of a conjugated diolefin, sulfur dioxide and polymerizable unsaturated hydrocarbons.

In one specific embodiment of the invention, the unsaturated polysulfones are prepared by an emulsion polymerization technique whereby insoluble polysulfones are separated from the polymerization medium prior to the hydrogenation reaction. In another embodiment, the polymerization reactions are carried out in the presence of certain solvents in which the unsaturated polysulfone products are at least partially soluble and the unsaturated polysulfones then are directly hydrogenated in the solvent-containing reaction media, thereby eliminating the necessity of separating the unsaturated products prior to hydrogenation.

Conjugated diolefins used to prepare the copolymers, terpolymers and quaterpolymers are preferably those having from 4 to about 8 carbon atoms. Examples of suitable compounds include 1,3-butadiene, 2-methyl-1,3-butadiene (isoprene), 1,3-pentadiene (piperylene), 1,3-hexadiene, 2,4-hexadiene, chloroprene, cyclopentadiene, cyclohexadiene, cyclooctadiene, etc.

Any of a number of ethylenically unsaturated comonomers may be used with $SO_2$ and a conjugated diene in preparing the polymeric unsaturated polysulfones, and especially those having from 2 to about 20 carbon atoms such as propylene, butenes, isobutylene, pentenes, hexenes, cyclopentene, etc.; vinyl aromatics having from 8 to about 12 carbon atoms such as styrene, etc.; functionally substituted olefins including halogen, cyano, amino, carboxyl, or carboxylate ester and hydroxyl substituted olefins of from 2 to about 10 carbon atoms, such as vinyl chloride, vinylidene chloride, ethyl acrylate, acrylonitrile, allyl amine, allyl alcohol, butenyl cyanide; conjugated diolefins of from 5 to about 8 carbon atoms such as 2,3-dimethylbutadiene, piperylene, isoprene, chloroprene, 4-cyanobutadiene-1,3, cyclopentadiene, cyclohexadiene, 1,3- and 2,4-hexadiene, 1,3-cyclooctadiene, etc.; acetylenes such as acetylene, vinyl acetylene, methyl vinylacetylene, and trioolefins such as hexatriene, etc.

By one method, the polymerization reaction may be carried out in solution wherein excess sulfur dioxide is the only solvent present, in which case the hydrocarbon monomers and initiator may simply be added to the sulfur dioxide or vice versa. Other solvents in which the monomeric materials are miscible, such as lower aliphatic alcohols, and aliphatic and aromatic hydrocarbons, may also be present. The unsaturated copolymeric polysulfones formed in the presence of these solvents will precipitate out upon formation and may thus be directly recovered.

In another embodiment of carrying out the invention the polymerization process whereby the unsaturated polysulfones are prepared is conducted in the presence of a sulfolane or phenolic or fluoroalcohol solvent in which the unsaturated polysulfones are soluble or swollen. This method of preparing the unsaturated polysulfones is quite advantageous since the preferred solvents used in the hydrogenation reaction of the invention are sulfolane, fluoroalcohols and particularly phenolic compounds. Indeed, it is surprising and unexpected that the unsaturated polysulfones may be prepared in this manner since phenolic compounds are notorious for their chain transfer properties which cause them to severely limit molecular weight and to behave generally as polymerization retarders or inhibitors. However, we have found that high molecular weight unsaturated polysulfones may be prepared by copolymerizing a conjugated diolefin and sulfur dioxide or terpolymerizing a conjugated diolefin, sulfur dioxide and a terpolymerizable unsaturated hydrocarbon monomer in phenolic compounds such as m-cresol, phenol, p-chlorophenol and the like. These unsaturated polysulfonates may be then directly hydrogenated to prepare the high molecular weight and thermally stable products as disclosed herein without the necessity of separating the unsaturated polysulfones and thereafter dissolving them prior to further treatment with hydrogen.

This particular embodiment will be better understood by reference to the accompanying drawing which schematically represents apparatus which may be used in a continuous method for preparing the hydrogenated polysulfones. According to the drawing the phenolic solvent may be introduced into the polymerization reactor A via line 1 along with sulfur dioxide (line 2) and the hydrocarbon monomer or monomers and initiator (line 3). After polymerization has reached the desired degree of completion, the reaction mixture containing the unsaturated polysulfone is withdrawn from reactor A to reactor B, for hydrogenation, through line 4. Any excess hydrocarbon monomer or sulfur dioxide present is removed via line 5. This excess material may optionally be recycled to the reactor A for subsequent polymerizations. Hydrogen and catalyst are introduced into the hydrogenation reaction vessel B by means of lines 6 and 7, respectively. After the hydrogenation reaction is complete, the final reaction mixture may be removed through line 8 to vessel C where the polysulfone is precipitated out by addition of a composition (line 10) in which the polymer is insoluble (lower aliphatic alcohols, aliphatic or aromatic hydrocarbons, etc.). In this vessel the catalyst and phenolic solvent may be extracted from the reaction composition; they may be recycled, after separation, to the appropriate reactor through lines 11 and 12, respectively. The final polysulfone product is then withdrawn from the vessel by means of line 9. It should be appreciated that instead of a continuous process utilizing different reaction and treatment vessels as set forth above, the whole process may be accomplished in one vessel in a batch type method.

Another method of preparing the unsaturated polysulfones is by the emulsion or suspensioin techniques whereby polymerization takes place generally in an aqueous medium with the aid of emulsifying or suspending agents. The monomeric hydrocarbon reactants are present almost entirely as emulsion or suspension droplets dispersed in the continuous phase.

The emulsifying agent used is not critical and may be anionic, cationic or non-ionic. However, since the aqueous phase is present usually in greater quantity than the oil phase, the use of anionic agents resulting in an oil-in-water type emulsion may be preferred. Suitable emulsifying agents which may be used include such materials as the fatty acids and their soaps including substituted derivatives of the fatty acids and rosin acids, sulfuric esters including salts of sulfated fatty oils and alcohols, alkane sulfonates, alkarylsulfonates, mahogany and petroleum sulfonates, as well as phosphorus-containing emulsifying agents. Some specific examples include the alkali metal salts of $C_{12}$ to $C_{18}$ straight chain carboxylic acids, e.g., sodium stearate, sodium oleate, and mixtures thereof as acids obtained from tallow, coconut oil, palm oil, etc., tall oil acid soaps, sodium lauryl sulfate, sodium dodecylbenzene sulfonate, sodium di(2-ethylhexyl)orthophosphate and the like. Any amount of emulsifying or suspending agent may be used which will provide at least a relatively stable emulsion or suspension of the polymerization ingredients. Generally, from about 0.5 to about 10% by weight of emulsifying agent is sufficient.

The polymerization reactions whereby the unsaturated polysulfones are prepared are catalyzed by a free radical initiator such as peroxides, azo-compounds or inorganic oxidizing agents which react with sulfur dioxide to yield a redox initiator system. Some specific examples include hydrogen peroxide, benzoyl peroxide, cumene hydroperoxide, di-tert-butyl-peroxide, ascaridole, tert-butyl hydroperoxide, acetyl peroxide, peracetic acid, silver nitrate, lithium nitrate, ammonium nitrate, as well as chlorates, perchlorates, nitrites, persulfates, trimethylamine oxide, dimethylaniline oxide, nitric oxide, nitrogen dioxide, perchloric, nitric and nitrous acids, diisobutylene ozonide, azobisisobutyronitrile etc. These catalysts may be present in amounts between about 0.01% and 5% and preferably between about 0.01% and 1.0% by weight.

The order in which the ingredients are added or mixed is not critical and generally any convenient method of preparing the reaction mixture may be utilized. It may be found convenient, for example, to add sulfur dioxide in liquid form at temperatures below $-10°$ C. Where such technique is used, it is preferable to have an aqueous phase which freezes at a lower temperature than $-10°$ C. wherein the presence of an alcohol or glycols with the water is satisfactory. Thus, the liquid sulfur dioxide may be added to the liquid aqueous phase conveniently without boiling. To this mixture are added the hydrocarbon monomers.

The ratio of hydrocarbon monomer or monomers to sulfur dioxide in the polymerization reaction mixture is not highly critical. Thus, a very large excess of sulfur dioxide may be employed or alternatively an excess of hydrocarbon monomer may be used since generally the copolymerization with SO₂ is much faster than the hydrocarbon homopolymerization. It has actually been found that, with the exception of the terpolymers wherein vinyl chloride or a vinyl aromatic such as styrene is utilized, the unsaturated polymers prepared as set forth above have an essentially perfectly alternating $\{A-SO_2\}$ structure where A represents one molecule of a hydrocarbon monomer regardless of the ratio of hydrocarbon to sulfur dioxide used in the polymerization. The most desirable ratio of reactants will vary from case to case and can be determined readily by those skilled in the art. Correspondingly, when terpolymerization or quaterpolymerization is practiced, the relative proportions of the hydrocarbon monomers used in the polymerization are determined by the concentration of the respective hydrocarbons desired in the product and by the pertinent relative reactivities. Generally, the relative reactivities are comparable so that any desired ratio of hydrocarbon monomers in the polymeric products may be achieved. Preferred polymers are those wherein the weight ratio of conjugated diolefin to ethylenically unsaturated comonomer is between about 20:1 and 1:20, respectively.

The temperatures used in the polymerization reactions are not particularly critical, but generally are most favorable between about −60° C. and 120° C. at autogenous pressures.

The molecular weight of the unhydrogenated polysulfones may be controlled over a wide range by adjusting polymerization conditions.

Prior to hydrogenation, the unsaturated polysulfones are placed in the hydrogenation medium. Suitable media for the hydrogenation process are organic polar solvents such as sulfolane, fluoro alcohols (e.g. trifluoroethanol, hexafluoroisopropanol, perfluoro t-butanol, etc.) and especially the phenolic solvents (e.g., phenol, halophenols, alkyl phenols, etc.) in which the unsaturated polysulfones are soluble or swollen. The phenolic compounds need not be pure. Indeed, mixtures are often desirable (e.g., mixed cresols). Phenol, p-chlorophenol, and the cresols are preferred. Generally for the terpolymers, heating to from about 25° C. to 150° C. in the presence of the solvents will induce solution. In the case of most of the terpolymeric polysulfones, solution is accomplished at temperatures below the temperature at which decomposition occurs. In the case of many of the conjugated diene-sulfur dioxide copolymeric polysulfones, especially that from butadiene, and their terpolymers containing only small amounts of termonomers, the polymer-solvent interaction at temperatures below the decomposition point may be limited to swelling.

The catalyst systems used in the hydrogenation reaction may be heterogeneous or homogeneous. Suitable heterogeneous catalysts include for example, platinum, rhodium, osmium, ruthenium, iridium, palladium, rhenium, nickel, cobalt, copper, chromium, iron and compounds thereof such as oxides, sulfides, carbonyls, etc. These catalysts may be used alone or supported on a relatively inert material such as carbon diatomaceous earth, alumina, silica, asbestos, pumice, etc. In order to achieve more efficient hydrogenation it may be necessary to keep the heterogeneous catalysts dispersed throughout the polymer-containing solution such as by stirring the reaction mixture or agitating the reaction vessel. Amounts of catalysts between about 0.01 and 10% by weight and preferably between about 0.1 and 5% by weight based on the polymer may be used.

Homogeneous catalysts offer the advantages of being rapidly dispersed throughout the reaction medium and of being less readily poisoned, thus permitting the hydrogenation of polysulfones which are only swollen by the solvent. Such homogeneous catalysts include among others the rhodium systems disclosed in copending application Ser. No. 417,482, filed Dec. 10, 1964, the descriptions of which are incorporated herein by reference. Preferred catalysts of this type are the rhodium halide complexes such as trichlorotris(triphenylarsine)rhodium (III) and chlorotris(triphenylphosphine)rhodium (I). The amount of such catalyst used is sufficient to provide from about 50 to 2000 p.p.m. and preferably from 100 to 1000 p.p.m. rhodium based on the polymer.

It is known that sulfur dioxide is poisonous to most catalysts, thereby rendering them ineffective for hydrogenation; the presence of free sulfur dioxide should be avoided at the time of hydrogenation. This is especially important when the hydrogenation directly follows the polymerization by a method wherein an excess of sulfur dioxide is used or when polymerization is interrupted before complete conversion of the monomers.

The hydrogenation reaction temperature may be from about room temperature, i.e., approximately 20° C. to about 200° C. Temperatures between about 25° C. and 150° C. are preferred and generally it is preferred to operate between about 80° and 130° C. The rate of hydrogenation will depend upon the particular polymer being reduced, the solvent, temperature, catalyst, solution viscosity, pressure, etc. Although hydrogenation would proceed slowly at one atmosphere of hydrogen pressure, it is normally desirable to use a large excess of hydrogen and thus hydrogen pressures of up to 10,000 p.s.i. or higher may be used; the preferred range is between about 500 and 2000 p.s.i. The hydrogen may be bubbled through the polymer-containing solution or slurry of swollen polymer or may be charged into a closed reaction vessel under pressure and then mixed with the solution by suitable means. The hydrogenation of the unsaturated polysulfones by the method as disclosed herein only affects the ethylenic unsaturation and does not in any way reduce the stable sulfone portion of the polymers.

Although for some products, complete hydrogenation may be desirable it is not necessary since any degree of hydrogenation of the original ethylenic unsaturation above about 50% results in highly stable and high melting polymers. In the case of highly crystalline polysulfones it is found that the degree of hydrogenation above about 50% may be varied without greatly sacrificing the crystallinity. The hydrogenated polymers have molecular weights of between about 20,000 and 1,000,000 as characterized by intrinsic viscosity of from about 0.5 to 5.5 dl./g. determined in a 1:1 mixture of m-cresol and p-chlorophenol at 25° C.

The following examples are provided to illustrate the manner in which the invention is carried out. It is to be understood that the examples are given for the purpose of illustration only and the invention is not to be regarded as limited to any of the specific compounds or conditions recited therein. Unless otherwise indicated, parts and percentages disclosed in the examples are given by weight. "Percent by weight" is abbreviated "%."

Example I

An unsaturated polysulfone was prepared by terpolymerizing butadiene, sulfur dioxide and styrene as follows: To an 8 oz. bottle was added 100 ml. water, 1 g. of sodium laurate sulfate, 0.25 g. NH₄NO₃ and 50 g. of liquid sulfur dioxide, the temperature of the mixture being maintained at about −11° C. Butadiene (15 g.) and styrene (15 g.) were then added to the bottle which was closed and the contents thoroughly stirred for about 3 hours at 30° C. The insoluble polysulfone product was present as a white slurry and was filtered and washed with methanol and dried. The unsaturated product contained 70% butadiene derived units and 30% styrene derived units in the hydrocarbon portion and 21.3% wt. sulfur.

Three grams of the terpolymer were then added to a 300 ml. autoclave containing 0.03 g. trichlorotris(diethylphenylarsine)rhodium (III), 0.24 g. triphenylphosphine and 30 ml. p-chlorophenol. The autoclave was sealed, purged with hydrogen, heated to about 120° C. and pressurized to 1400 p.s.i. with hydrogen. The contents of the reaction vessel were continually stirred while the hydrogenation reaction went to completion in about 14 hours. The terpolymeric sulfone was recovered from the reaction solution by pouring it into a Waring Blendor containing methanol, the mixture then being agitated until the polysulfone product had separated out. The polymer was then filtered and again mixed with methanol repeatedly until essentially all of the catalyst had been removed as evidenced by the absence of the characteristic yellow color from the product. Infrared analysis showed the polysulfone to be free of olefinic unsaturation. The product had a melting point of 223° C., a $T_{1/2}$ of 367° C. and was soluble in p-chlorophenol, m-cresol, and sulfolane at 100° C. ($T_{1/2}$ or half decomposition point is the temperature at which one half of the original polymer weight is lost at a heating rate of 2½° C. per minute under nitrogen.)

The unhydrogenated terpolymer had a $T_{1/2}$ of 275° C. at which temperature no melting had occurred.

Example II

A terpolymer of butadiene, sulfur dioxide and trans-piperylene was prepared as follows: To an autoclave containing 800 ml. of m-cresol solvent and 0.5 g. of azobisisobutyronitrile initiator was added 22.3 g. of sulfur dioxide and a mixture of 139 g. butadiene and 104 g. trans-piperylene. The reaction vessel was closed and heated to a temperature near 50° C. for 90 hours while the reaction mixture was continuously agitated. The vessel was then opened and purged of unreacted monomers.

To this reaction mixture containing the unsaturated polysulfone was added 0.4 gram trichlorotris(diethylphenylarsine)rhodium (III) and 4.0 grams triphenylphosphine. The autoclave was then closed and hydrogen was introduced until a pressure of 1070 p.s.i. was obtained at 100° C. The contents of the autoclave were stirred for about 12 hours at 1500 r.p.m. to insure rapid dissolving of the hydrogen.

The reaction solution containing the hydrogenated polysulfone terpolymer was blended with methanol and recovered in the manner described in Example I. The olefinic bonds present in the unhydrogenated terpolymer were completely hydrogenated as evidenced by infrared analysis. The polymer had a melting point of 225° C. at which temperature there was no evidence of degradation.

The combined filtrate and washings were fractionated to separate into a methanol fraction, a m-cresol fraction and a residue fraction which contained rhodium compounds and triphenylphosphine. The m-cresol was used in a repeat polymerization; after purging unreacted monomers the catalyst-containing concentrate was added. Hydrogenation proceeded at a slightly slower rate than in the first cycle.

Example III

An unsaturated polysulfone was prepared by terpolymerizing butadiene, sulfur dioxide, and norbornene as follows: To an 8 oz. bottle was added 100 ml. water, 1 g. of sodium lauryl sulfate, 0.25 g. of $NH_4NO_3$ and 50 g. of liquid sulfur dioxide, the temperature of the mixture being maintained at about −11° C. Butadiene (15 g.) and norbornene (10 g.) were then added to the bottle which was closed and the contents thoroughly agitated for 16 hours at 10° C. The insoluble product was present as a white slurry and was filtered and washed with methanol and dried. The unsaturated product contained 40% butadiene and 60% norbornene in the hydrocarbon portion.

The terpolymer then was placed in the glass liner for a 300 ml. autoclave to which was added 0.03 g. of trichlorotris(diethylphenylarsine)rhodium (III), 0.24 g. triphenylphosphine and 30 ml. p-chlorophenol. The autoclave was sealed, purged with hydrogen, heated to 115° C. and pressurized to 1472 p.s.i. with hydrogen. The reaction was continually agitated while the hydrogenation went to completion in 14 hours. The terpolymeric polysulfone was recovered from the reaction solution by pouring it into a Waring Blendor containing methanol. The polymer was then filtered and again mixed with methanol repeatedly until all of the catalyst had been removed as evidenced by the absence of the characteristic yellow color from the product. Infrared analysis showed the polysulfone to be essentially free of olefinic unsaturation. The product had a melting point of 281° C. and a $T_{1/2}$ of 404° C. By comparison, the unhydrogenated terpolymer had a $T_{1/2}$ of 270° C. at which point no melting had occurred.

Example IV

In an 8 oz. bottle were placed 33.8 g. of commercial piperylene which contained about 12% cyclopentene, 32.4 g. of sulfur dioxide, 80 ml. of water, 20 ml. of methanol, 0.50 g. of ammonium nitrate, and 0.80 g. of sodium lauryl sulfate emulsifying agent. The bottle was shaken near room temperature for 17 hours to produce 59.4 g. of white powdery polymer which contained 23.5% w. sulfur by analysis. Pyrolytic analysis of this polymer indicated 88% w. piperylene and 12% w. cyclopentene to have been incorporated in the hydrocarbon portion of the polymer.

Ten grams of the terpolymer dissolved in 200 ml. of m-cresol and 1.0 g. of triphenylphosphine and 0.10 g. of trichlorotris(diethylphenylarsine)rhodium (III) were added in an autoclave under 1000 p.s.i.g. hydrogen and stirred for 20 hours at 100° C. The resulting mixture was flooded with methanol to obtain a polysulfone which was completely hydrogenated as shown by infrared analysis. This polymer could be pressed to clear colorless, fairly stiff films and had a melting point of 236° C. and a $T_{1/2}$ of 360° C. By comparison, the unhydrogenated terpolymer and a $T_{1/2}$ of 260° C.

Example V

To a one quart bottle containing 500 ml. of a mixture of 80% water, 20% methanol, 0.5 g. of $NH_4NO_3$ initiator and 4 g. of sodium lauryl sulfate was added 67.8 of liquid sulfur dioxide, the mixture being maintained at about −11° C. A mixture of 33.4 g. butadiene and 27.0 g. of trans-piperylene was then introduced to the bottle which was then sealed; the contents were then thoroughly mixed. The reaction was allowed to proceed near room temperature for about 16 hours while the emulsion was continually agitated. The insoluble polysulfone product (119 g.) which was present as a white slurry in the reaction mixture was filtered and washed with ethanol. The product contained 25.1 w. sulfur by elemental analysis and 45% w. piperylene and 55% w. butadiene in the hydrocarbon portion by pyrolytic analysis. The product was soluble in p-chlorophenol and m-cresol at 100° C. and remained in solution upon cooling to room temperature.

A 10 gram sample of the terpolymeric poly sulfone prepared above from butadiene, sulfur dioxide and piperylene was placed in a glass liner for a 300 ml. autoclave to which also was added 100 mg. trichlorotris(diethylphenylarsine)rhodium (III), 1.0 g. triphenylphosphine and 200 ml. of p-chlorophenol. The liner was then placed in an autoclave. The vessel was purged with hydrogen which was then introduced to a pressure of 1000 p.s.i. and the reaction mixture heated to about 100° C. for 14 hours during which time the autoclave was constantly agitated.

The product mixture was a solution containing the hydrogenated polysulfone which was recovered by pouring the solution into methanol containing some hydrochloric acid which was being agitated in a Waring Blendor. The polysulfone which is insoluble in the alcohol began to precipitate out of solution and was filtered off. The polymer was returned to the blender and again mixed with methanol and filtered, this step being repeated until no more of the color from the catalyst could be detected in the filtrate. The dried polysulfone powder melted at 220° C. without showing signs of instability or decomposition and possessed an intrinsic viscosity of 1.98 in 50/50 m-cresol/ p-chlorophenol at 25° C. The polymer was soluble in p-chlorophenol, m-cresol, phenol, and the like at about 100° C. The polymer was completely hydrogenated as evidenced by infrared analysis.

The polymer was placed into an extruder type spinning apparatus and melt spun into filaments at 235° C.; the filaments were stretched to 150% of original length at 25° C. and then to 400% at 105° C. They were found to have the following properties:

| | |
|---|---|
| Melting point ° C | 220 |
| Intrinsic viscosity (25° C. in 1:1 m-cresol and p-chlorophenol 0.3 g./100 ml.) dl./g | 1.98 |
| Bending recovery [1] deg | 179+ |
| Tenacity [2] g./den | 3.1 |
| Elongation [3] percent | 15 |
| Tan $\delta$ [4] | 0.054 |

[1] Bending recovery is a measurement of ability of a filament to recover from great deformation and thus may be considered a measure of long term resilience. The test comprises bending a polymer filament over a rod of approximately ten times the filament diameter for one minute and then allowing the filament to recover free of stress for three minutes. The angle of the residual bend of the fiber is then measured. A bending recovery of 180° C. indicates complete recovery.
[2] Tenacity was tested according to ASTM D 1380–59T, modified to use rate of extension of 125% per minute and a four inch sample length.
[3] Elongation was tested according to ASTM D 1380–59T, modified to use rate of extension of 125% per minute and a four inch sample length.
[4] Tan $\delta$ (loss tangent) is a measure of the internal friction of a specimen and hence an indicator of the short term resilience or "springiness" of fibers. The loss tangent is the ratio of energy lost to the energy retained in a cyclic process such as oscillation in a torsion pendulum. Values of tan $\delta$ were determined on filaments with a torsion pendulum in vacuum at 0.1 c.p.s. at 23° C. See "Physical Methods of Investigating Textiles" R. Meredith and J. W. S. Heale, Textile Book Publ. (1959) Chap. 8, Sec. 8.4.

Example VI

The procedure of Example V was repeated replacing piperylene with isoprene. Alternate sulfur dioxide terpolymers containing about 20, 40 and 75% isoprene were hydrogenated in m-cresol at 115° C. using the same soluble complex rhodium catalyst system. Hydrogenation of isoprene segments proceeded more slowly than did the hydrogenation of butadiene or piperylene segments; however, hydrogenation was complete in 64 hours under 1000 p.s.i.g. hydrogen pressure. Opaque white, hard, stiff films of the polymers were pressed at 250° C. without any signs of decomposition. Fibers of the polymer were extruded and stretched following Example V. These fibers had tenacities to 2.8 g./den., excellent stiffness and good bending recovery.

Example VII

The procedure of Example VI was repeated except that terpolymers containing 20, 30 and 40% isoprene were only partially hydrogenated to about 80, 70 and 60%, respectively. These products possessed a high degree of crystallinity and had melting points of about 240°, 220° and 210° C. and $T_{1/2}$ of 372, 352 and 343° C., respectively. The corresponding unhydrogenated terpolymers, however, decomposed at temperatures from 260–270° C.

Example VIII

Water (400 cc.), methanol (100 cc.), $NH_4NO_3$ (0.5 g.) sodium lauryl sulfate (4 g.), sulfur dioxide (80 g.), butadiene (35 g.), piperylene (17.5 g.) and isoprene (12 g.) were combined as in Example I and polymerized for 10 hours. The white powdery product was isolated and washed with ethanol and dried. Ten grams of the polymer was dissolved in 200 ml. of m-cresol and 1.0 g. of triphenylphosphine and 0.1 of trischlorotris(diethylphenylarsine)rhodium (III) were added. This mixture was heated under 1000 p.s.i.g. hydrogen for 64 hours at 110° C. in an autoclave and subsequently precipitated with methanol containing 5% conc. HCl. The resultant polysulfone showed negligible trans-olefinic double bond absorption in the infrared, showing that it was substantially completely hydrogenated, had a melting point of 225° C. and could be spun into fibers and pressed into films having attractive properties.

Example IX

An alternating sulfur dioxide-butadiene copolymer was prepared from butadiene (15 g.) and excess $SO_2$ (50 g.) following the procedure of Example III. One gram of the isolated, dried powdery copolymer was suspended in 300 ml. of p-chlorophenol by rapidly agitating in a semi-micro blender. This suspension was placed in the glass liner of a 300 ml. autoclave to which was added 0.030 g. trichlorotris (diethylphenylarsine)rhodium (III) and 0.60 g. triphenylphosphine. The liner was placed in an autoclave. After purging the vessel with hydrogen, the pressure was increased to 1122 p.s.i. and the reaction mixture heated to about 128° C. for 67 hours.

The reaction product, a homogeneous solution, was worked up by pouring into methanol which was being agitated in a Waring Blendor. The polymer which is insoluble in the alcohol precipitated out of solution and was filtered off. The methanol washing was repeated until no more yellow color of the catalyst could be observed in the filtrate. The dried polysulfone was shown to be completely saturated by infrared analysis and melted at 282° C. and had an intrinsic viscosity of 2.0 in 1:1 p-chlorophenol:m-cresol at 25° C. It was shown to have the composition $(CH_2-CH_2-CH_2-CH_2-SO_2)_x$ by elemental analyses.

Comparatively, an unhydrogenated butadiene-sulfur dioxide copolymeric sulfone prepared in the same manner decomposed rapidly at 225° C. at which temperature no melting of the polymer had occurred.

Example X

Alternating copolymers of sulfur dioxide and piperylene or isoprene, respectively, were prepared as in Example III. Each copolymer was hydrogenated as in Example I. The polymers were completely soluble at the hydrogenation temperature and remained in solution after hydrogenation until precipitated with methanol. Infrared analyses showed them to be completely hydrogenated. They were stable at their melting points and could be molded into white, stiff films.

Example XI

A reaction mixture consisting of cyclooctadiene-1,3 (20 g.), butadiene (5 g.), $SO_2$ (50 g.), water (100 g.), sodium lauryl sulfate (1 g.) and ammonium nitrate initiator (0.25 g.) was agitated for 16 hours at 30° C. The product, isolated as in the previous examples, contained 50% cyclooctadiene-derived units and 50% butadiene-derived units in the hydrocarbon portion. The sulfur analysis was 21.8% w.

A 2 gram sample of this polymer was placed in the glass liner for a 300 ml. autoclave to which was added 0.25 g. of 10% platinum on celite and 20 ml. p-chlorophenol. The liner was placed in an autoclave. After purging the vessel with hydrogen the pressure was increased to 1135 p.s.i. and the reaction mixture heated to about 100° C. for 21 hours during which time the autoclave was constantly agitated.

The reaction product was filtered to remove the catalyst. The hydrogenated polysulfone was recovered by pouring the solution into methanol which was being agitated in a Waring Blendor. The polymer, which is insoluble in the alchol, precipitated out of solution and was filtered off. The dried polysulfone, a white powder, was shown to be 80 to 90% saturated by infrared analysis and had a melting point of 242° C. and a $T_{1/2}$ of 330° C. It could be molded into stiff films without any signs of decomposition. The unhydrogenated terpolymer had a $T_{1/2}$ of 260° C. at which point no melting had occurred.

Example XII

The hydrogenation of Example XI was repeated substituting 0.25 g. of 10% rhodium metal supported on carbon for the platinum catalyst. Hydrogenation was again 80–90% complete in 21 hours at about 100° C.

Example XIII

A 2.0 g. sample of a 71% butadiene, 29% cyclooctadiene-SO$_2$ terpolymer was placed in the glass liner of a 300 ml. autoclave to which had been added 20 ml. p-chlorophenol and 0.3 g. Raney nickel. The bomb was purged with hydrogen and then pressured to 785 p.s.i. with hydrogen. While the reaction mixture was continuously agitated it was heated to about 140° C. for 21 hours.

The polymer was recovered by filtering off the nickel and then pouring the resulting polymer solution into methanol which was being agitated in a Waring Blendor. The resulting polymer was shown to be approximately 60% saturated and could be pressed into stiff clear, bubble-free films at 200° C. and 40,000 p.s.i.

Example XIV

A total of 23.0 g. (0.36 mole) of SO$_2$ was bubbled into a mixture of 10.6 g. (0.20 mole) butadiene and 246.6 g. (1.02 mole) lauryl acrylate for over 15 minutes near 25° C. with stirring. Tert-butyl hydroperoxide (100 mg.) was then added at 10 and 25 mg. increments over 15 minutes with continued stirring. The resulting polymer was washed repeatedly with acetone and benzene and vacuum dried to 3.5 g. The resultant white powdery polymer contained 14.5% sulfur and showed both lauryl acrylate and butadiene-derived units to be present in the polymer by infrared analysis. The polymer was soluble in m-cresol at 100° C.

This terpolymer (2.6 g.) was hydrogenated using 200 ml. m-cresol, 0.10 g. trichlorotris(diethylphenylarsine) rhodium (III) and 1.0 g. triphenylphosphine, stirred under 1000 p.s.i.g. of hydrogen overnight at 100° C. The product was precipitated from the solution with 5% aqueous HCl in methanol and washed thoroughly with methanol. The resulting polymer was shown by infrared spectra to be saturated and it could be pressed into tough films.

We claim as our invention:

1. A process for preparing stable high molecular weight polysulfones which comprises the steps of:
   (a) copolymerizing a feed mixture selected from the group consisting of
      (1) a conjugated diolefin having from 4 to about 8 carbon atoms and sulfur dioxide, and
      (2) a conjugated diolefin having from 4 to about 8 carbon atoms, sulfur dioxide and at least one copolymerizable monomer containing at least one olefinic double bond and having from 2 to about 20 carbon atoms,
   in the presence of a free radical initiator and an organic polar solvent in which the resulting unsaturated polysulfone is swollen or at least partially soluble,
   (b) removing any excess monomer and initiator from the reaction mixture, and
   (c) hydrogenating in the presence of added hydrogenation catalyst the resulting reaction mixture which contains said unsaturated polysulfone.

2. A process according to claim 1 wherein said solvent is selected from the group consisting of sulfolane, fluoroalcohols and phenols.

3. A process according to claim 2 wherein said hydrogenation catalyst is a homogeneous catalyst.

4. A process according to claim 2 wherein the original olefinic unsaturation of said unsaturated polysulfone is reduced by at least 50% during said hydrogenation.

5. A process according to claim 2 wherein said conjugated diolefin is butadiene.

6. A process according to claim 5 wherein said copolymerizable monomer is a pentadiene.

7. A process according to claim 3 wherein said hydrogenation is carried out at a temperature in the range from 25 to 150° C. and the solvent is phenol, a cresol or p-chlorophenol.

8. A process for preparing stable high molecular weight polysulfones comprising hydrogenating the olefinic double bonds of an ethylenically unsaturated polysulfone selected from the group consisting of:
   (a) a copolymer of a conjugated diolefin having from 4 to about 8 carbon atoms and sulfur dioxide, and
   (b) a polymer of a conjugated diolefin having from 4 to about 8 carbon atoms, sulfur dioxide and at least one copolymerizable monomer containing at least one olefinic double bond and having from 2 to about 20 carbon atoms,
at a temperature between about 25° C. and 150° C. in the presence of a hydrogenation catalyst and an organic polar solvent in which the unsaturated polysulfone is swollen or at least partially soluble.

9. A process according to claim 8 wherein said solvent is selected from the group consisting of sulfolane, fluoroalcohols and phenols.

10. A process according to claim 9 wherein said conjugated diolefin is butadiene.

11. A process according to claim 9 wherein said hydrogenation catalyst is a homogeneous catalyst.

12. A process according to claim 9 wherein the olefinic unsaturation of said unsaturated polysulfone is reduced by at least 50% during said hydrogenation.

13. A process for preparing stable high molecular weight polysulfones comprising hydrogenating the olefinic double bonds of an ethylenically unsaturated copolymer of a conjugated diolefin having from 4 to about 8 carbon atoms and sulfur dioxide at a temperature between about 25° C. and 150° C. in the presence of a solvent selected from the group consisting of sulfolane, fluoroalcohols and phenols in which the copolymer is swollen or at least partially soluble, and a homogeneous hydrogenation catalyst, wherein the original olefinic unsaturation of said copolymer is reduced by at least about 50%.

14. A process according to claim 13 wherein said conjugated diolefin is butadiene.

15. A process according to claim 13 wherein said solvent is phenol, a cresol or p-chlorophenol.

16. A process according to claim 13 wherein said homogeneous catalyst is chlorotris(triphenylphosphine)-rhodium I.

17. A process for preparing stable high molecular weight and highly crystalline polysulfones comprising hydrogenating the olefin double bonds of an ethylenically unsaturated terpolymer of butadiene, sulfur dioxide and a conjugated diolefin selected from piperylene, isoprene and mixtures thereof, at a temperature between about 25° C. and 150° C. in the presence of a solvent selected from the group consisting of sulfolane, fluoroalcohols and phenols in which the terpolymer is swollen or at least partially soluble, and a homogeneous hydrogenation catalyst, wherein the original olefinic unsaturation of said terpolymer is reduced by at least about 50%.

18. A process according to claim 17 wherein said conjugated diolefin is isoprene.

19. A process according to claim 17 wherein said conjugated diolefin is piperylene.

20. A process according to claim 17 wherein said solvent is phenol, a cresol or p-chlorophenol.

References Cited

UNITED STATES PATENTS

| 3,336,272 | 8/1967 | Youngman et al. | |
| 3,336,273 | 8/1967 | Youngman et al. | |
| 3,336,274 | 8/1967 | Youngman et al. | |
| 2,365,122 | 12/1944 | Troyler | 260—96 |
| 2,585,583 | 2/1952 | Pinkner | 260—96 |
| 2,864,809 | 12/1958 | Jones et al. | 260—96 |

JAMES A. SEIDLECK, *Primary Examiner.*

U.S. Cl. X.R.

260—30.2, 33.4, 96